DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 8

T903,021
PYRAZOLONE DERIVATIVES

William F. Coffey, % Eastman Kodak Co., Kodak Park, Rochester, N.Y. 14650

Filed Jan. 17, 1972, Ser. No. 218,555
**Int. Cl. G03c *1/40***
U.S. Cl. 96—100
No Drawing. 13 Pages Specification

Azomethine magenta dye-forming color photographic couplers of the formulae (I) 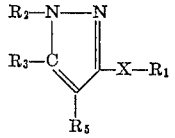 or (II) 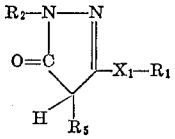

wherein

X is —S—, —Se—,

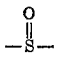

or —$SO_2$—;

$X_1$ is —Se—,

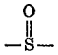

or —$SO_2$—;

$R_1$ and $R_2$ are branched or unbranched alkyl groups having 1–20 carbon atoms, or an aryl group such as a phenyl or a naphthyl radical or a heterocyclic radical;

$R_3$ is defined as an acyloxy radical such as $R_4$—CO—O in which $R_4$ is an alkyl group of 1–20 carbon atoms or an aryl group; and $R_5$ is defined as a hydrogen atom, or a coupling off group such as a halo, an aryloxy, an arylthio, an alkylthio, an alkoxy, an acyloxy, a thiocyano, or a heterocyclic radical attached to the pyrazolone ring by an —O— or —S— group;

also included within the invention is an alkaline color developing solution containing a diffusible coupler compound of the above-defined class; a color photographic silver halide emulsion containing nondiffusible coupler compounds as above-defined; color photographic elements including diffusion transfer-type elements and having one or more of the defined couplers contained therein; and a process for forming azomethine dyes by reacting couplers of the above class with oxidized color developing agent.